Jan. 4, 1949.  F. PENNELL  2,458,413

WIRE CONNECTOR

Filed March 29, 1946

INVENTOR:
FORD PENNELL

BY Rodney Bedell
ATTORNEY.

Patented Jan. 4, 1949

2,458,413

UNITED STATES PATENT OFFICE 2,458,413

WIRE CONNECTOR

Ford Pennell, Webster Groves, Mo., assignor to Jane Booth Pennell, Webster Groves, Mo.

Application March 29, 1946, Serial No. 658,168

10 Claims. (Cl. 24—135)

The invention relates to connectors used to clamp together wires or other electrical conductors where it is important that good contact be effected so as to facilitate the flow of current from one wire to the other.

One object of the invention is to provide a small, light compact wire connector, simple in design and cheap to manufacture, which is suitable for use in a conduit box and which makes a small compact joint easy to tape.

Another object is to obtain a secure joint and good contact between two wires without mutilating the wires.

These and other objects of the invention, as will appear below, are attained by the structure shown in the accompanying drawings, which structure is intended to be illustrative of other elements providing the general inventive principle. In these drawings.

Figure 1:
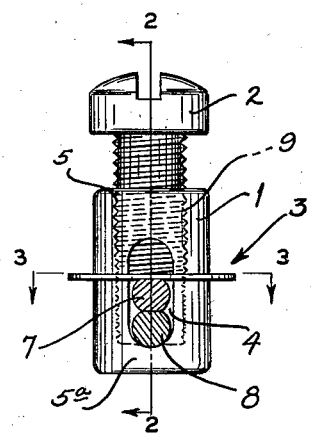
Figure 1 is an elevation of a connector constructed according to the invention.
Figure 2:
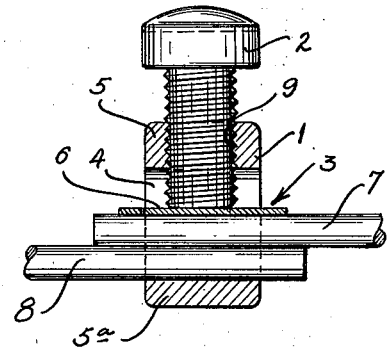
Figure 2 is a transverse vertical section taken approximately on line 2—2 of Figure 1.
Figure 3:
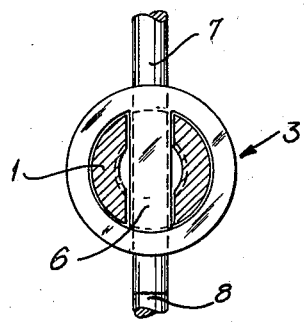
Figure 3 is a horizontal section taken approximately on line 3—3 of Figure 1.
Figure 4:
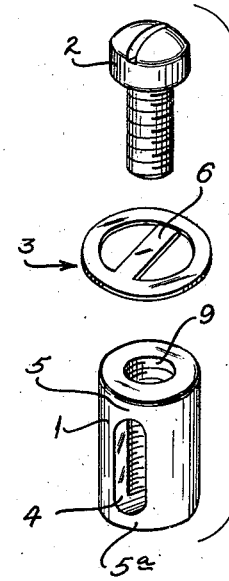
Figure 4 is an exploded view showing the various parts comprising the connector.

The connector shown in Figures 1 to 4, inclusive, comprises a body member 1, a screw 2 threaded therein, and a washer 3 encircling body member 1.

Body member 1 is substantially cylindrical in shape and has an elongated opening 4 extending transversely therethrough with its ends closed by integral parts 5 and 5a of body member 1. End part 5 of body member 1 is threaded axially at 9 to receive screw 2, which normally extends into opening 4, and is encircled by end part 5.

Washer 3 is ring shaped and an integral tongue 6 projects from the inner periphery of the washer and extends diametrically of the washer through opening 4 and the closed ends of opening 4 to prevent accidental removal of washer 3 from body member 1. Screw 2 engages tongue 6 and cooperates with part 5a to press wires 7 and 8, positioned in opening 4, into engagement with each other. Wires 7 and 8 overlap a short distance and the ends preferably extend beyond the outer periphery of washer 3 to provide good contact at the joint.

One end of tongue 6 is disconnected from the adjacent periphery of washer 3 and washer 3 is assembled to body member 1 by bending tongue 6 and inserting it into opening 4, then sliding washer 3 over part 5a of body member 1. When tongue 6 is released, it springs back to its original shape.

Figure 5:
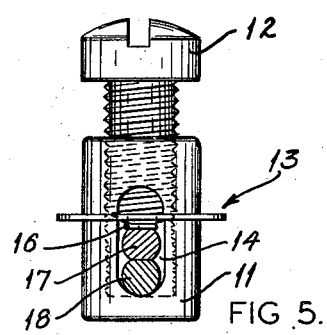
Figure 5 is an elevation of a connector illustrating another embodiment of the invention.
Figure 6:
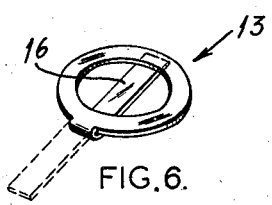
Figure 6 is a perspective of a washer comprising one of the elements of the connector shown in Figure 5.

The embodiment shown in Figures 5 and 6 comprises a body member 11, a screw 12 and a washer 13 similar to those of Figures 1 to 4, inclusive, with the exception that integral tongue 16 of washer 13 extends from the outer periphery of the washer and is bent back upon the washer and extends diametrically thereof through opening 14 of body member 11 and the free end of tongue 16 preferably extends over the face of washer 13. The washer tongue may be bent as shown in Figure 6 before or after assembly of the washer on the body as may be more convenient.

The washer preferably is positioned on body member 11 with tongue 16 below the washer so that neither the washer nor tongue 16 is distorted when screw 12 is tightened to exert thrust on the wires 17 and 18 which are passed through the device and held as described in connection with Figures 1 to 4. The connector shown in Figures 5 and 6 is assembled as described above by bending tongue 16 and inserting it into opening 14, then sliding washer 13 on to body member 11.

The washer may be made of steel, copper, alloys of steel or copper, or plastic or other material of such elasticity to return to its original shape after the washer has been assembled to the body member and hard enough not to distort when engaged by the screw.

A connector constructed according to the invention is small, light and compact, simple in design and cheap to manufacture and may be used in a conduit box. The connector makes a small, compact joint which is easy to tape. The connection provides a secure joint making good contact without mutilating the wires. Also, the connector may be installed without first disassembling it.

Other details of the invention described and illustrated may be varied without departing from the spirit of the invention and the exclusive use of those modifications coming within the scope of the claims is contemplated.

What is claimed is:

1. A wire connector comprising a body member having a transverse opening with closed ends for receiving wires, a washer surrounding at least a portion of said body member and having a tongue extending into and held by the ends of said opening against accidental removal of said washer lengthwise of said body member, and means to exert pressure on said washer to cause said washer to engage a wire positioned in said opening.

2. A wire connector comprising a body member having a transverse opening with closed ends for receiving wires, a washer surrounding at least a portion of said body member and having a tongue extending into and held by the ends of said opening against accidental removal of said washer lengthwise of said body member, said tongue being pliable to facilitate assembly of said washer to said body member, and means to exert pressure on said washer to cause said washer to engage a wire positioned in said opening.

3. A wire connector comprising a body member having a transverse opening to receive wires, a washer surrounding at least a portion of said body member and having a tongue extending into said opening to prevent accidental removal of said washer therefrom, and a screw threaded through said body member and encircled thereby and engaging said washer to exert pressure thereon to cause said washer to engage a wire positioned in said opening.

4. A wire connector comprising a body member having a transverse opening for receiving a plurality of wires, integral parts of said body member bounding the sides and ends of said opening, a washer surrounding at least a portion of said body member and having a tongue extending into said opening to prevent accidental removal of said washer from said body member, means threaded to one of said integral parts to exert pressure on said washer and cooperating with the opposite integral part to press the wires into engagement with each other.

5. A wire connector comprising a body member having a transverse opening terminating short of the ends of said member for receiving wires, a washer surrounding said body member and having a tongue extending into said opening to prevent accidental removal of said washer from the body member, and a screw threaded into said body member and encircled thereby and extending into said opening and engaging said tongue to cause said tongue to exert pressure on a wire positioned in said opening.

6. A wire connector comprising a body member having an elongated opening with closed ends, a screw threaded into said body member and extending into said opening, and a washer surrounding said body member and having a tongue extending through said opening with one end integral with the washer and with the other end disconnected from said washer to facilitate assembly of said washer to said body member.

7. A wire connector comprising a body having an elongated opening extending therethrough to receive a plurality of wires, a set screw threaded into said body and encircled thereby and extending into said opening, a pressure bearing member arranged for engagement by said screw and having a tongue extending into said opening and having a shell surrounding said body to maintain assembly of the member and body.

8. A wire connector comprising a body member having an opening extending therethrough to receive wires, a washer surrounding said body member and having a tongue integral with its inner periphery and extending into said opening to prevent accidental removal of said washer from said body member, and screw means threaded to said body member and encircled thereby to engage said washer and to exert pressure thereon to cause said washer to engage a wire positioned in said opening.

9. A wire connector comprising a body member having an opening extending therethrough to receive wires, a washer surrounding said body member and having a tongue integral with its outer periphery and folded back upon said washer and extending substantially radially inwardly of said washer into said opening, and screw means threaded to said member to exert pressure on said washer causing said washer to engage a wire positioned in said opening.

10. A wire connector comprising a body member having a transverse opening closed at its ends for receiving wires, a washer surrounding at least a portion of said body member and having a tongue extending into said opening to prevent accidental removal of said washer from said body member, and means to exert pressure on said washer to cause said washer to engage a wire positioned in said opening, the tongue on said washer being bendable to assemble said washer to said body member, said washer being of material possessing sufficient elasticity to return said tongue to its original shape after assembly and of sufficient hardness so that said washer is not distorted when engaged by said means.

FORD PENNELL.

REFERENCES CITED

The following references are of record in the file of this patent:

UNITED STATES PATENTS

| Number | Name | Date |
|---|---|---|
| 398,819 | Colton | Mar. 5, 1889 |
| 875,872 | Walsh | Jan. 7, 1908 |
| 2,032,394 | Becker | Mar. 5, 1936 |